United States Patent
Butler et al.

(10) Patent No.: US 11,609,032 B2
(45) Date of Patent: Mar. 21, 2023

(54) REFRIGERANT LEAK SENSOR MEASUREMENT ADJUSTMENT SYSTEMS AND METHODS

(71) Applicant: Emerson Climate Technologies, Inc., Sidney, OH (US)

(72) Inventors: Brian R. Butler, Centerville, OH (US); David Alfano, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 156 days.

(21) Appl. No.: 17/077,479

(22) Filed: Oct. 22, 2020

(65) Prior Publication Data
US 2022/0128282 A1  Apr. 28, 2022

(51) Int. Cl.
 *F25B 49/02* (2006.01)
 *F24F 11/36* (2018.01)
(52) U.S. Cl.
 CPC ............. *F25B 49/02* (2013.01); *F24F 11/36* (2018.01); *F25B 2400/21* (2013.01); *F25B 2500/222* (2013.01); *F25B 2600/05* (2013.01); *F25B 2700/02* (2013.01); *F25B 2700/04* (2013.01); *F25B 2700/19* (2013.01); *F25B 2700/21* (2013.01)
(58) Field of Classification Search
 CPC ............... F25B 49/02; F25B 2500/222; F25B 2700/02; F25B 2700/04; F25B 2700/19; F25B 2700/21; F24F 11/36
 See application file for complete search history.

(56) References Cited

U.S. PATENT DOCUMENTS

| 5,357,781 | A | 10/1994 | Tikijian |
| 5,511,006 | A * | 4/1996 | Tachibana ............... F24F 11/00 454/187 |
| 5,820,262 | A | 10/1998 | Lechner |
| 6,644,047 | B2 | 11/2003 | Taira et al. |

(Continued)

FOREIGN PATENT DOCUMENTS

| EP | 1970651 A1 | 9/2008 |
| EP | 3051236 A1 | 8/2016 |

(Continued)

OTHER PUBLICATIONS

Examiner-Initiated Interview Summary regarding U.S. Appl. No. 16/940,843 dated Feb. 5, 2021.

(Continued)

*Primary Examiner* — Jonathan Bradford
(74) *Attorney, Agent, or Firm* — Harness, Dickey & Pierce, P.L.C.

(57) ABSTRACT

A refrigerant measurement adjustment system includes: a refrigerant sensor for a building and configured to measure an amount of refrigerant present in air outside of a refrigeration system of the building; and an adjustment module configured to: adjust the amount of refrigerant measured based on an adjustment to produce an adjusted amount; and determine the adjustment based on at least one of: an air temperature; an air pressure; a relative humidity of air; a mode of operation of the refrigeration system; a change in the measurements of the refrigerant sensor over time; and whether a blower that blows air across a heat exchanger of the refrigeration system located within the building is on.

17 Claims, 6 Drawing Sheets

(56) References Cited

U.S. PATENT DOCUMENTS

| | | |
|---|---|---|
| 6,655,161 B1 | 12/2003 | Koo |
| 6,701,722 B1 | 3/2004 | Seo et al. |
| 6,772,598 B1 | 8/2004 | Rinehart |
| 6,791,088 B1 | 9/2004 | Williams, II et al. |
| 6,973,794 B2 | 12/2005 | Street et al. |
| 7,197,914 B2 | 4/2007 | Maresca, Jr. et al. |
| 7,814,757 B2 | 10/2010 | Zima et al. |
| 8,899,099 B2 | 12/2014 | Grosse Bley et al. |
| 8,924,026 B2 | 12/2014 | Federspiel et al. |
| 9,222,711 B2 | 12/2015 | Ochiai et al. |
| 9,625,195 B2 | 4/2017 | Hiraki et al. |
| 9,933,205 B2 | 4/2018 | Hatomura et al. |
| 10,047,990 B2 | 8/2018 | Marshall et al. |
| 10,354,332 B2 | 7/2019 | Trainor et al. |
| 10,514,176 B2 | 12/2019 | Weinert |
| 10,533,764 B2 | 1/2020 | Yamada et al. |
| 10,569,620 B2 | 2/2020 | Vehr et al. |
| 10,571,171 B2 | 2/2020 | Gariety et al. |
| 2005/0263394 A1 | 12/2005 | Lewis et al. |
| 2012/0318011 A1 | 12/2012 | Ochiai et al. |
| 2014/0188402 A1* | 7/2014 | Garcia ............. G01N 33/48792 702/23 |
| 2016/0178229 A1 | 6/2016 | Chen et al. |
| 2019/0056133 A1 | 2/2019 | Green et al. |
| 2019/0170599 A1 | 6/2019 | Kester |
| 2019/0170603 A1 | 6/2019 | Gupte et al. |
| 2019/0170604 A1 | 6/2019 | Kester |
| 2019/0226705 A1 | 7/2019 | Sakae et al. |
| 2019/0242632 A1 | 8/2019 | Sakae et al. |
| 2019/0301780 A1 | 10/2019 | Schmidt et al. |
| 2019/0323917 A1* | 10/2019 | Shi ..................... G01M 3/2815 |
| 2019/0331377 A1 | 10/2019 | Matsuda et al. |
| 2019/0368752 A1 | 12/2019 | Shiohama et al. |
| 2019/0390876 A1 | 12/2019 | Matsuda et al. |
| 2020/0011580 A1 | 1/2020 | Matsuda et al. |
| 2020/0124306 A1 | 4/2020 | Kowald et al. |
| 2020/0248919 A1* | 8/2020 | Green ................. G05B 19/042 |

FOREIGN PATENT DOCUMENTS

| | | |
|---|---|---|
| EP | 3287720 A1 | 2/2018 |
| EP | 3358278 A1 | 8/2018 |
| EP | 3418655 A1 | 12/2018 |
| EP | 1970651 B1 | 7/2019 |
| EP | 3604981 A1 | 2/2020 |
| JP | S6270747 A * | 4/1987 |
| WO | WO-2017058997 A1 | 4/2017 |
| WO | WO-2019150462 A1 | 8/2019 |
| WO | WO-2019171483 A1 * | 9/2019 |

OTHER PUBLICATIONS

Feng, Shaobin, et al. "Review on Smart Gas Sensing Technology," MDPI Journal on Sensors 2019; Basel Switzerland, Published Aug. 30, 2019.

Danfoss Application Guide: "Gas Detection in Refrigeration Systems", 2018.

Nevanda Nano: "Leak Detection Technologies for A2L Refrigerants in HVACR Equipment: Summary of AHRTI Final Report Findings" SM-AN-0012-02.

Islam, Tarikul and Mukjopadhyay, S.C.; "Linearization of the Sensors Characteristics: a review", Exeley International Journal on Smart Sensing and Intelligent Systems Article DOI 10.21307/ijssis-2019-007; Isue 1 vol. 12; 2019.

Final Office Action regarding U.S. Appl. No. 16/940,843 dated Mar. 18, 2021.

Applicant-Initiated Interview Summary regarding U.S. Appl. No. 16/940,843 dated May 4, 2021.

* cited by examiner

REFRIGERANT LEAK SENSOR MEASUREMENT ADJUSTMENT SYSTEMS AND METHODS

FIELD

The present disclosure relates to refrigerant leak sensors and more particularly to systems and methods for controlling measurements of refrigerant leak sensors.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Refrigeration and air conditioning applications are under increased regulatory pressure to reduce the global warming potential of the refrigerants they use. In order to use lower global warming potential refrigerants, the flammability of the refrigerants may increase.

Several refrigerants have been developed that are considered low global warming potential options, and they have an ASHRAE (American Society of Heating, Refrigerating and Air-Conditioning Engineers) classification as A2L, meaning mildly flammable. The UL (Underwriters Laboratory) 60335-2-40 standard, and similar standards, specifies a predetermined (M1) level for A2L (or mildly flammable) refrigerants and indicates that A2L refrigerant charge levels below the predetermined level do not require leak detection and mitigation.

SUMMARY

In a feature, a refrigerant measurement adjustment system includes: a refrigerant sensor for a building and configured to measure an amount of refrigerant present in air outside of a refrigeration system of the building; and an adjustment module configured to: adjust the amount of refrigerant measured based on an adjustment to produce an adjusted amount; and determine the adjustment based on at least one of: an air temperature; an air pressure; a relative humidity of air; a mode of operation of the refrigeration system; a change in the measurements of the refrigerant sensor over time; and whether a blower that blows air across a heat exchanger of the refrigeration system located within the building is on.

In further features, a leak module is configured to indicate whether a refrigerant leak is present based on the adjusted measurement.

In further features, the adjustment module is configured to determine the adjustment based on the air temperature.

In further features, the adjustment module is configured to determine the adjustment based on a change in the air temperature.

In further features, the adjustment module is configured to determine the adjustment based on the air pressure.

In further features, the adjustment module is configured to determine the adjustment based on a change in the air pressure.

In further features, the adjustment module is configured to determine the adjustment based on the relative humidity.

In further features, the adjustment module is configured to determine the adjustment based on a change in the relative humidity.

In further features, the adjustment module is configured to set the adjustment based on the amount of refrigerant measured when the mode of operation is in a heating mode for a predetermined period.

In further features, the adjustment module is configured to set the adjustment based on the amount of refrigerant measured after a pumpout of refrigerant from within the building has been performed.

In further features, the adjustment module is configured to set the adjustment based on the amount of refrigerant measured when the mode of operation transitions from a cooling mode to a heating mode and a pumpout of refrigerant from within the building has been performed.

In further features, the adjustment module is configured to set the adjustment based on the amount of refrigerant measured when the blower has been on for at least a predetermined period.

In further features, the adjustment module is configured to: adjust the amount of refrigerant further based on a second adjustment to produce the adjusted measurement; and determine the second adjustment based on the change in the amount of refrigerant measured by the refrigerant sensor over time.

In further features, the adjustment module is configured to set the adjusted amount based on one of (a) the amount of refrigerant measured plus the adjustment and (b) the amount of refrigerant measured minus the adjustment.

In further features, the adjustment module is configured to set the adjusted amount based on the amount of refrigerant measured multiplied by the adjustment.

In further features, the adjustment module is configured to adjust the amount based on at least two adjustments determined based on at least two of: the air temperature; the air pressure; the relative humidity of air; the mode of operation of the refrigeration system; the change in the measurements of the refrigerant sensor over time; and whether the blower that blows air across the heat exchanger of the refrigeration system located within the building is on.

In further features, the adjustment module is configured to adjust the amount based on adjustments determined based on each of: the air temperature; the air pressure; the relative humidity of air; the mode of operation of the refrigeration system; the change in the measurements of the refrigerant sensor over time; and whether the blower that blows air across the heat exchanger of the refrigeration system located within the building is on.

In further features: the adjustment module is configured to adjust the amount of refrigerant measured based on the change in the measurements of the refrigerant sensor over time; and the refrigerant measurement adjustment system further includes an end of life module configured to indicate that the refrigerant sensor is at an end of its useful life when a magnitude of the change is greater than a predetermined value.

In further features: the adjustment module is configured to adjust the amount of refrigerant measured based on the change in the measurements of the refrigerant sensor over time; and the refrigerant measurement adjustment system further includes an end of life module configured to indicate that the refrigerant sensor is at an end of its useful life when a magnitude of the change increases on at least a predetermined number of consecutive instances.

In a feature, a refrigerant measurement adjustment method includes: by a refrigerant sensor for a building, measuring an amount of refrigerant present in air outside of a refrigeration system of the building; adjusting the amount of refrigerant measured based on an adjustment to produce an adjusted amount; determining the adjustment based on at least one of: an air temperature; an air pressure; a relative humidity of air; a mode of operation of the refrigeration system; a change in the measurements of the refrigerant sensor over time; and whether a blower that blows air across a heat exchanger of the refrigeration system located within the building is on.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Some refrigerants used in refrigeration systems may be classified as mildly flammable (e.g., A2L refrigerants). Refrigeration systems using mildly flammable refrigerant may include a refrigerant leak sensor configured to measure an amount of refrigerant that is present in air outside of the refrigeration system within a building served by the refrigeration system. This amount of refrigerant corresponds to an amount of refrigerant that has leaked out of the refrigeration system.

The measurements of a refrigerant leak sensor may naturally change over time as the refrigerant leak sensor ages. For example, the measurements of the refrigerant leak sensor may drift over time. The measurements of the refrigerant leak sensor may also vary due to one or more operating conditions, such as a mode of operation of a refrigeration system, whether a blower is on, and/or a relative humidity, a temperature, or a pressure of air at the refrigerant leak sensor.

The present application involves adjusting the measurements of the refrigerant leak sensor in view of the above. This increases accuracy of the measurements and increase a lifetime of the refrigerant leak sensor.

Figure 1:
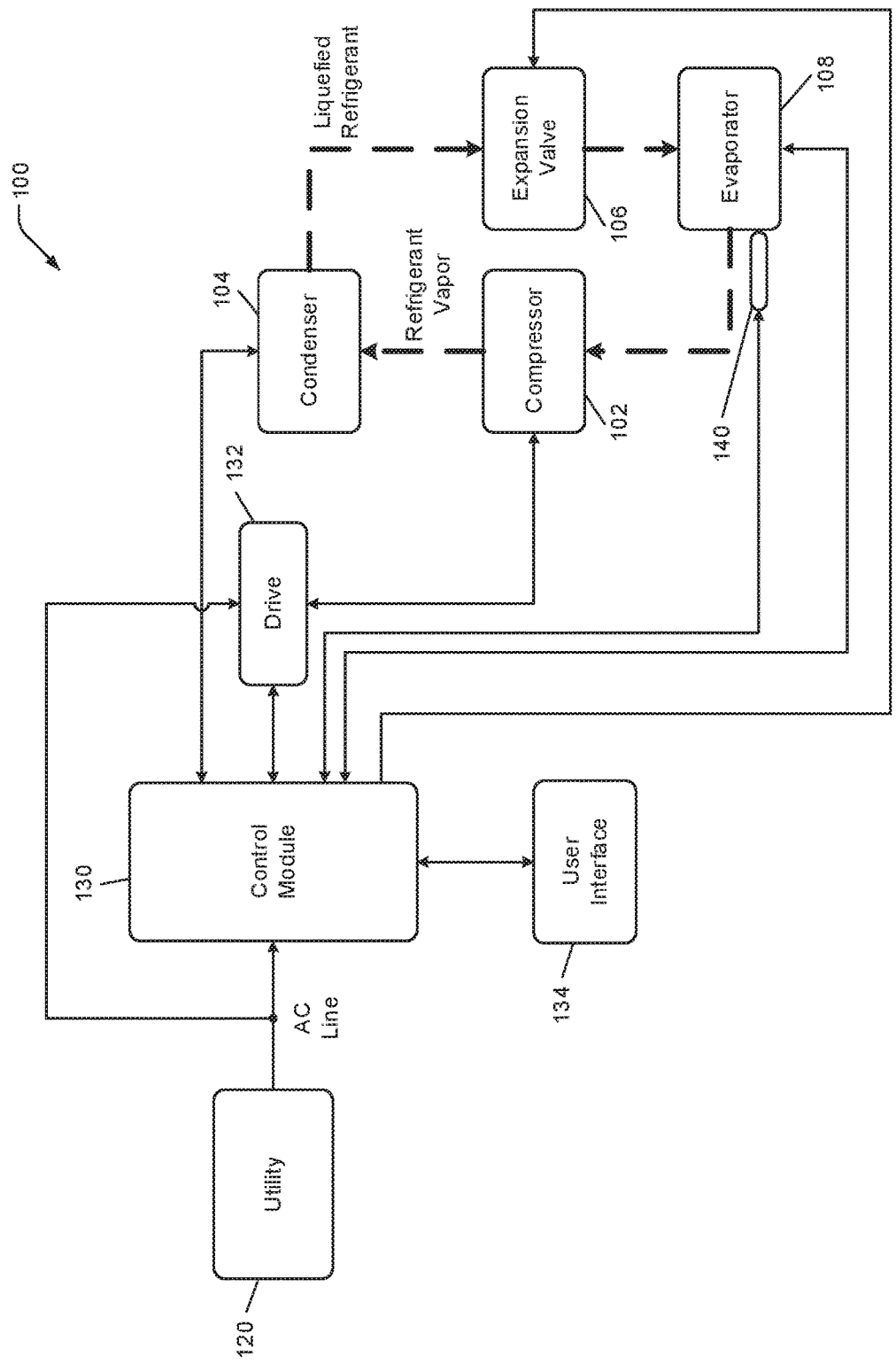
FIG. 1 is a functional block diagram of an example refrigeration system.

FIG. 1 is a functional block diagram of an example refrigeration system 100 including a compressor 102, a condenser 104, an expansion valve 106, and an evaporator 108. The refrigeration system 100 may include additional and/or alternative components, such as a reversing valve or a filter-drier. In addition, the present disclosure is applicable to other types of refrigeration systems including, but not limited to, heating, ventilating, and air conditioning (HVAC), heat pump, refrigeration, and chiller systems. For example, the refrigeration system 100 may include a reversing valve (not shown) that is configured to reverse a direction of refrigerant flow in a heat pump system.

The compressor 102 receives refrigerant in vapor form and compresses the refrigerant. The compressor 102 provides pressurized refrigerant in vapor form to the condenser 104. The compressor 102 includes an electric motor that drives a pump. For example only, the pump of the compressor 102 may include a scroll compressor and/or a reciprocating compressor.

All or a portion of the pressurized refrigerant is converted into liquid form within the condenser 104. The condenser 104 transfers heat away from the refrigerant, thereby cooling the refrigerant. When the refrigerant vapor is cooled to a temperature that is less than a saturation temperature, the refrigerant transforms into a liquid (or liquefied) refrigerant. The condenser 104 may include an electric fan that increases the rate of heat transfer away from the refrigerant.

The condenser 104 provides the refrigerant to the evaporator 108 via the expansion valve 106. The expansion valve 106 controls the flow rate at which the refrigerant is supplied to the evaporator 108. The expansion valve 106 may include a thermostatic expansion valve or may be controlled electronically by, for example, a control module 130. A pressure drop caused by the expansion valve 106 may cause a portion of the liquefied refrigerant to transform back into the vapor form. In this manner, the evaporator 108 may receive a mixture of refrigerant vapor and liquefied refrigerant.

The refrigerant absorbs heat in the evaporator 108. Liquid refrigerant transitions into vapor form when warmed to a temperature that is greater than the saturation temperature of the refrigerant. The evaporator 108 may include an electric fan that increases the rate of heat transfer to the refrigerant.

A utility 120 provides power to the refrigeration system 100. For example only, the utility 120 may provide single-phase alternating current (AC) power at approximately 230 Volts root mean squared ($V_{RMS}$). In other implementations, the utility 120 may provide three-phase AC power at approximately 400 $V_{RMS}$, 480 $V_{RMS}$, or 600 $V_{RMS}$ at a line frequency of, for example, 50 or 60 Hz. When the three-phase AC power is nominally 600 $V_{RMS}$, the actual available voltage of the power may be 575 $V_{RMS}$.

The utility 120 may provide the AC power to the control module 130 via an AC line, which includes two or more conductors. The AC power may also be provided to a drive 132 via the AC line. The control module 130 controls the refrigeration system 100. For example only, the control module 130 may control the refrigeration system 100 based on user inputs and/or parameters measured by various sensors (not shown). The sensors may include pressure sensors, temperature sensors, current sensors, voltage sensors, etc. The sensors may also include feedback information from the drive control, such as motor currents or torque, over a serial data bus or other suitable data buses.

A user interface 134 provides user inputs to the control module 130. The user interface 134 may additionally or alternatively provide the user inputs directly to the drive 132. The user inputs may include, for example, a desired temperature, requests regarding operation of a fan (e.g., a request for continuous operation of the evaporator fan), and/or other suitable inputs. The user interface 134 may take the form of a thermostat, and some or all functions of the control module (including, for example, actuating a heat source) may be incorporated into the thermostat.

The control module 130 may control operation of the fan of the condenser 104, the fan of the evaporator 108, and the expansion valve 106. The control module 130 may also control actuation of the reversing valve.

The drive 132 may control the compressor 102 based on commands from the control module 130. For example only, the control module 130 may instruct the drive 132 to operate the motor of the compressor 102 at a certain speed or to operate the compressor 102 at a certain capacity. In various implementations, the drive 132 may also control the condenser fan.

The evaporator 108 may be located within a building served by the refrigeration system. The condenser 104 may be located outside of the building. In heat pump systems, the functions of the evaporator 108 and the condenser 104 are switched depending on whether heating is to be performed within the building or cooling is to be performed within the building. When cooling is performed, the condenser 104 and the evaporator 108 perform as described above. When heating is performed, coolant flow is reversed, and the condenser 104 and the evaporator 108 operate oppositely. The condenser 104 and the evaporator 108 may therefore be more generally referred to as heat exchangers.

A refrigerant leak sensor 140 is disposed inside of the building and measures an amount (e.g., concentration) of refrigerant in air (outside of the refrigeration system) present at the refrigerant leak sensor. The refrigerant leak sensor 140 may be located, for example, near the evaporator 108, such as downstream of a blower that blows air across the evaporator 108 and into the building through ducts. The refrigerant leak sensor 140 may also be located downstream of evaporator 108.

The refrigerant leak sensor 140 generates a signal based on the amount of refrigerant measured. For example, the refrigerant leak sensor 140 may transmit the amount of refrigerant to the control module 130. Alternatively, the refrigerant leak sensor 140 may set the signal to a first state when the amount is greater than a predetermined amount and set the signal to a second state when the amount is less than the predetermined amount. The predetermined amount may be, for example, 25 percent of a lower flammability level of the refrigerant or another suitable value. In various implementations, the refrigerant is classified under one or more standards as being mildly flammable. For example only, the refrigerant may be classified as an A2L refrigerant or more generally mildly flammable as discussed above. The classification may be, for example, by a standard of ASHRAE (American Society of Heating, Refrigerating and Air-Conditioning Engineers), UL (Underwriters Laboratory) 60335-2-40 standard, or in another standard which may be by ASHRAE, UL, or another regulatory body.

The control module 130 receives the output of the refrigerant leak sensor 140 and determines whether a refrigerant leak is present based on the output. For example, the control module 130 may determine that a leak is present when the output is in the first state or when the amount is greater than the predetermined amount. If the amount is less than the predetermined amount or the output is in the second state, the control module 130 may determine that no leak is present.

One or more remedial actions may be taken when a refrigerant leak is present (e.g., the signal indicates that the amount is greater than the predetermined value or the signal is in the first state). For example, the control module 130 may turn on the blower (that blows air across the evaporator 108) when a leak is present. Turning on the blower may disperse leaked refrigerant. Additionally, the control module 130 may turn off the compressor 102 and maintain the compressor 102 off until the leak is remediated (e.g., for a predetermined period). Additionally, the control module 130 may actuate lockout devices to prevent ignition by one or more ignition devices within the building. Additionally or alternatively, the control module 130 may close one or more isolation valves to isolate the refrigerant outside of the building. In various implementations, a first isolation valve may be implemented directly between the condenser 104 and the expansion valve 106. The control module 130 may close the first isolation valve when a leak is detected. A second isolation valve may be implemented directly between the evaporator 108 and the compressor 102. The control module 130 may maintain the second isolation valve open while the compressor 102 is on and the first isolation valve is closed to pump refrigerant out from within the building. The control module 130 may close the second isolation valve after operation of the compressor 102 for a predetermined period with the first isolation valve closed.

Additionally or alternatively, the control module 130 may generate one or more indicators when a leak is present. For example, the control module 130 may transmit an indicator to one or more external devices, generate one or more visual indicators (e.g., turn on one or more lights, display information on one or more displays, etc.), and/or generate one or more audible indicators, such as via one or more speakers.

The refrigerant leak sensor 140 may be, for example, non dispersive infrared (NDIR) refrigerant sensor, a thermal conductivity refrigerant sensor, a quartz crystal microbalance (QCM) sensor, or another suitable type of refrigerant leak sensor. NDIR sensors include an infrared (IR) lamp that transmits light through a tube. A fan or blower may push or pull gas (e.g., air and, if a leak is present, refrigerant) through the tube. An optical sensor receives light from the IR lamp through the tube and measures the amount of refrigerant in the gas based on one or more characteristics of the light. A thermal conductivity sensor includes conductive plates between which the gas may be pushed or pulled by a blower or a fan. The blower or fan may be omitted in various implementations. Different amounts of refrigerant have different thermal conductivities. Thermal conductivity sensors include two temperature sensors (e.g., one before and one after a heating element). A thermal conductivity sensor determines a temperature difference between the measurements from the two sensors. Given a known heating input from the heating element, the thermal conductivity sensor determines the amount of the refrigerant based on the temperature difference. Different amounts of refrigerant have different densities and may therefore cause different vibrations. QCM sensors measure the amount of refrigerant in the gas based on the vibration. Other examples of refrigerant leak sensors 140 include metal oxide refrigerant sensors, acoustic refrigerant sensors, quartz resonation (e.g., QCM) refrigerant sensors, and carbon nanotube refrigerant sensors. Metal oxide refrigerant sensors measure a resistance across a surface oxidizer heated by a hotplate. In the presence of the refrigerant, the resistance of the oxidizing layer may decrease. As refrigerant dissipates, the resistance of the oxidizing layer may increase. A metal oxide refrigerant sensor may determine the amount of refrigerant based on the resistance.

The amount of refrigerant measured by the refrigerant leak sensor 140 may naturally deviate from the actual amount of refrigerant present over time. For example, the amount of refrigerant measured may drift over time. One or more ambient conditions (e.g., temperature, pressure, humidity) may cause inaccuracy in the amount of refrigerant measured by the refrigerant leak sensor 140. The blower being on may also cause the amount of refrigerant measured to be inaccurate. The response of the refrigerant leak sensor 140 to change in one or more ambient conditions (e.g., temperature, pressure, humidity) may also slow or speed up over time.

The present application involves adjusting the amount of refrigerant measured by the refrigerant leak sensor 140 to account for the above. For example, an adjustment for drift may be determined and used to adjust the amount of refrigerant measured. Additionally or alternatively, one or more adjustments may be determined based on one or more ambient conditions and used to adjust the amount of refrigerant measured. Additionally or alternatively, an adjustment for when a change in an ambient condition occurs may be determined and used to adjust the amount of refrigerant measured. Additionally or alternatively, an adjustment may be determined for when the blower is on and used to adjust the amount of refrigerant measured. Additionally or alternatively, an adjustment may be determined based on a difference between measurements during heating and cooling mode operation and used to adjust the amount of refrigerant measured.

Figure 2:
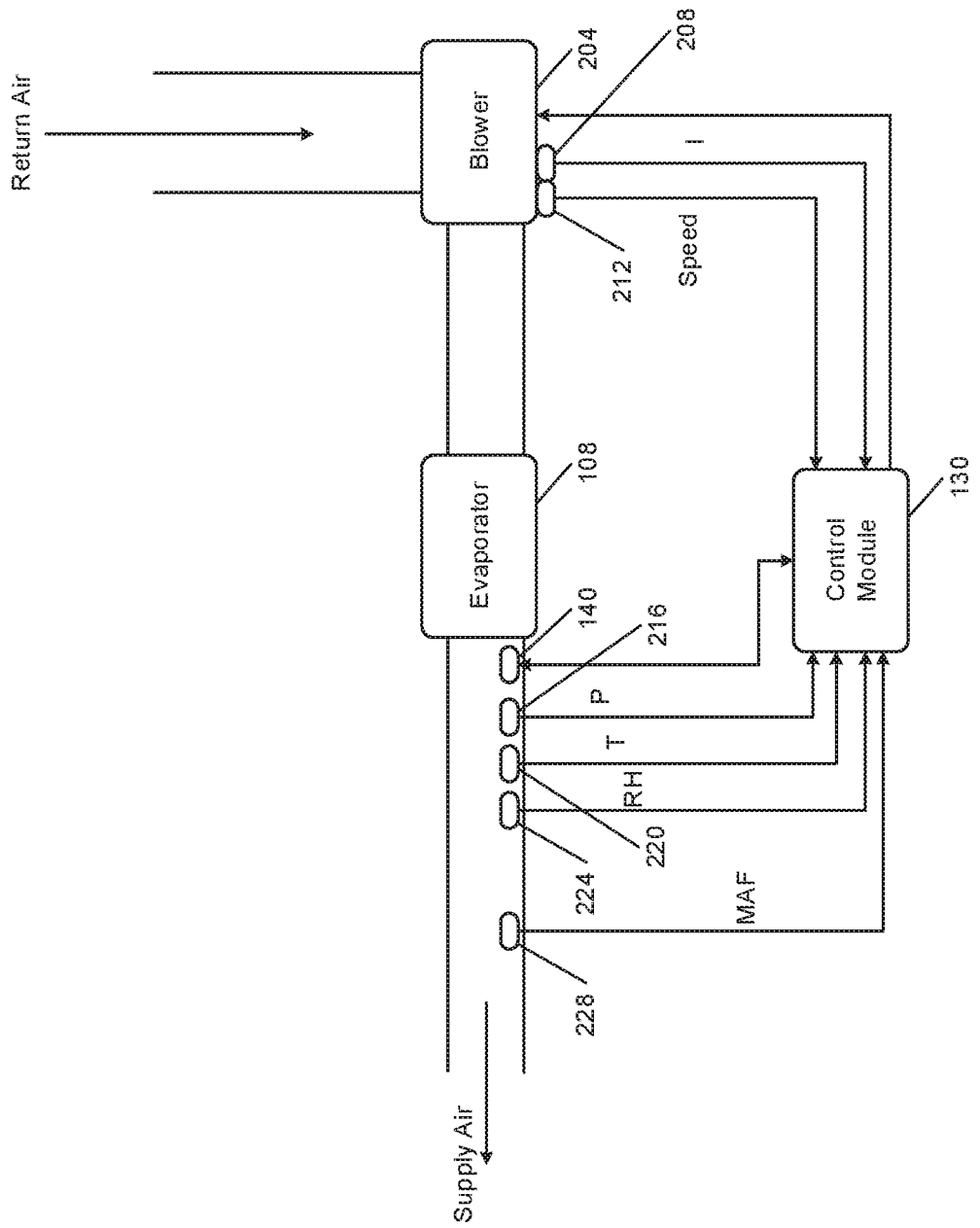
FIG. 2 is a functional block diagram of an example portion of the refrigeration system of FIG. 1.

FIG. 2 is a functional block diagram of an example portion of the refrigeration system of FIG. 1. When on, a blower 204 draws air in from within the building through one or more return air ducts. The blower 204 forces air past the evaporator 108. The evaporator 108 transfers heat to or from the air as the air passes the evaporator 108. Heated or cooled air flows from the evaporator 108 to within the building through one or more supply air ducts.

One or more sensors may be implemented in addition to the refrigerant leak sensor 140. For example, a motor current sensor 208 may measure current to the blower 204 and more specifically to an electric motor of the blower 204. The control module 130 may determine that the blower 204 is on (and turn off the refrigerant leak sensor 140) when the current is greater than a predetermined current.

Additionally or alternatively, a voltage sensor may measure a voltage applied to the electric motor of the blower 204. The control module 130 may determine that the blower 204 is on (and turn off the refrigerant leak sensor 140) when the voltage is greater than a predetermined voltage.

Additionally or alternatively, a power sensor may measure a power consumption of the electric motor of the blower 204. The control module 130 may determine that the blower 204 is on (and turn off the refrigerant leak sensor 140) when the power consumption is greater than a predetermined power.

Additionally or alternatively, a speed sensor 212 may measure a rotational speed of the electric motor of the blower 204. The control module 130 may determine that the blower 204 is on (and turn off the refrigerant leak sensor 140) when the speed is greater than a predetermined speed.

Additionally or alternatively, one or more sensors may be implemented downstream of the evaporator 108. For example, a pressure sensor 216 may measure a pressure of air downstream of the evaporator 108 (e.g., in a supply air duct). The control module 130 may determine that the blower 204 is on (and turn off the refrigerant leak sensor 140) when the pressure is greater than a predetermined pressure (e.g., a barometric pressure). The pressure may approach barometric pressure when the blower 204 is off. The pressure may increase relative to barometric pressure when the blower 204 is on.

Additionally or alternatively, a temperature sensor 220 may measure a temperature of air downstream of the evaporator 108 (e.g., in a supply air duct). The control module 130 may determine that the blower 204 is on (and turn off the refrigerant leak sensor 140) when the temperature is greater than a predetermined temperature (e.g., a setpoint pressure of the thermostat) during heating or less than the predetermined temperature during cooling. The temperature measured by the temperature sensor 220 may be an ambient temperature while the blower 204 is off.

Additionally or alternatively, a relative humidity sensor 224 may measure a relative humidity (RH) of air downstream of the evaporator 108 (e.g., in a supply air duct). The control module 130 may determine that the blower 204 is on (and turn off the refrigerant leak sensor 140) when the relative humidity is greater than or less than a predetermined relative humidity. Different predetermined relative humidities may be used for heating mode and cooling mode. The relative humidity measured by the relative humidity sensor 224 may be an ambient relative humidity while the blower 204 is off.

Additionally or alternatively, an air flowrate (e.g., mass air flowrate (MAF)) sensor 228 may measure a flowrate (e.g., a mass flowrate) of air downstream of the evaporator 108 (e.g., in a supply air duct). The control module 130 may determine that the blower 204 is on (and turn off the refrigerant leak sensor 140) when the air flowrate is greater than a predetermined air flowrate.

While example locations of sensors are provided in FIG. 2, the sensors may be located in other suitable locations. Additionally, one or more of the sensors of FIG. 2 may be omitted or duplicated.

Figure 3:
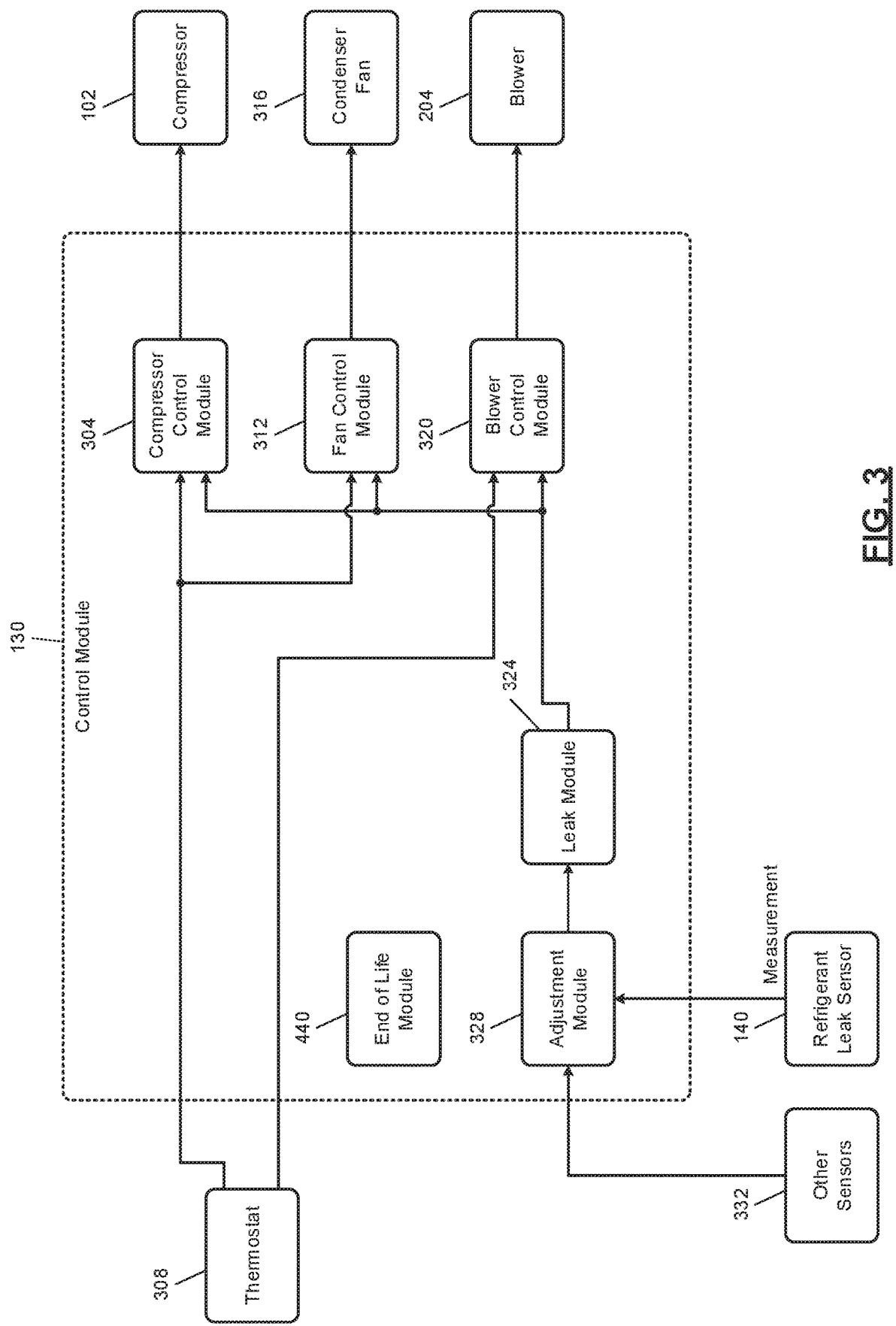
FIG. 3 is a functional block diagrams of example implementations of a control module.

FIG. 3 is a functional block diagram of an example implementation of the control module 130. A compressor control module 304 controls operation of the compressor 102. For example, the compressor control module 304 may turn on the compressor 102 in response to receipt of a command (e.g., cool mode command) from a thermostat 308. The thermostat 308 may generate the command, for example, when a temperature of air within the building is greater than a setpoint temperature (in the example of cooling) or less than the setpoint temperature (in the example of heating). The compressor control module 304 may vary a speed and/or capacity of the compressor 102 when the compressor 102 is on. The compressor control module 304 may turn the compressor 102 off when the thermostat 308 stops generating the command.

A fan control module 312 controls operation of the condenser fan 316. The condenser fan 316 increases airflow past the condenser 104 when the condenser fan 316 is on. For example, the fan control module 312 may turn on the condenser fan 316 in response to receipt of the command from the thermostat 308. The fan control module 312 may turn the condenser fan 316 off when the thermostat 308 stops generating the command. In various implementations, the fan control module 312 may turn the condenser fan 316 on before the compressor 102 is turned on and maintain the condenser fan 316 on for a predetermined period after the compressor 102 is turned off.

A blower control module 320 controls operation of the blower 204. For example, the blower control module 320 may turn on the blower 204 in response to receipt of the command from the thermostat 308. The blower control module 320 may also turn on the blower 204 in response to receipt of a command for heating from the thermostat 308. The blower control module 320 may also turn on the blower 204 in response to receipt of a command to turn the blower 204 on (Fan On command) from the thermostat 308. The blower control module 320 may turn the blower 204 off when the thermostat 308 is not generating any of the commands. In various implementations, the blower control module 320 may turn the blower 204 on before the compressor 102 is turned on and maintain the blower 204 on for a predetermined period after the compressor 102 is turned off.

The control modules discussed herein turn a device on by applying power to the device. The control modules turn a device off by disconnecting the device from power.

The blower control module 320 may also turn the blower 204 on when a refrigerant leak is detected using the refrigerant leak sensor 140. For example, a leak module 324 may determine that a refrigerant leak is present in the refrigeration system when the amount of refrigerant measured outside of the refrigeration system by the refrigerant leak sensor 140 is greater than a predetermined amount. The leak module 324 may determine that a refrigerant leak is not present when the amount is less than the predetermined amount.

One or more other remedial actions may be taken when a refrigerant leak is present in the refrigeration system, such as described above. For example, the compressor control module 304 may turn the compressor 102 off and maintain the compressor 102 off for a predetermined period when a refrigerant leak is present. One or more isolation valves may also be closed, such as to pump refrigerant out from within the building and to trap the refrigerant outside of the building.

As discussed above, the amount of refrigerant measured by the refrigerant leak sensor 140 may vary from the actual amount of refrigerant present at the refrigerant leak sensor 140. An adjustment module 328 adjusts the amount of refrigerant measured by the refrigerant leak sensor before the (adjusted) amount of refrigerant is used, such as by the leak module 324. The adjustment module 328 may determine one or more adjustments based on measurements from one or more other sensors 332, such as the temperature sensor 220, the relative humidity sensor 224, the pressure sensor 216, and/or one or more other types of sensors. While the adjusting module 328 is illustrated as being implemented within the control module 130, the adjustment module 328 may be implemented within the refrigerant leak sensor 140 or a portion of the functionality of the adjustment module 328 may be implemented within the refrigerant leak sensor 140 and a portion (e.g., the remainder) of the functionality of the adjustment module 328 may be implemented within the control module 130.

Figure 4:
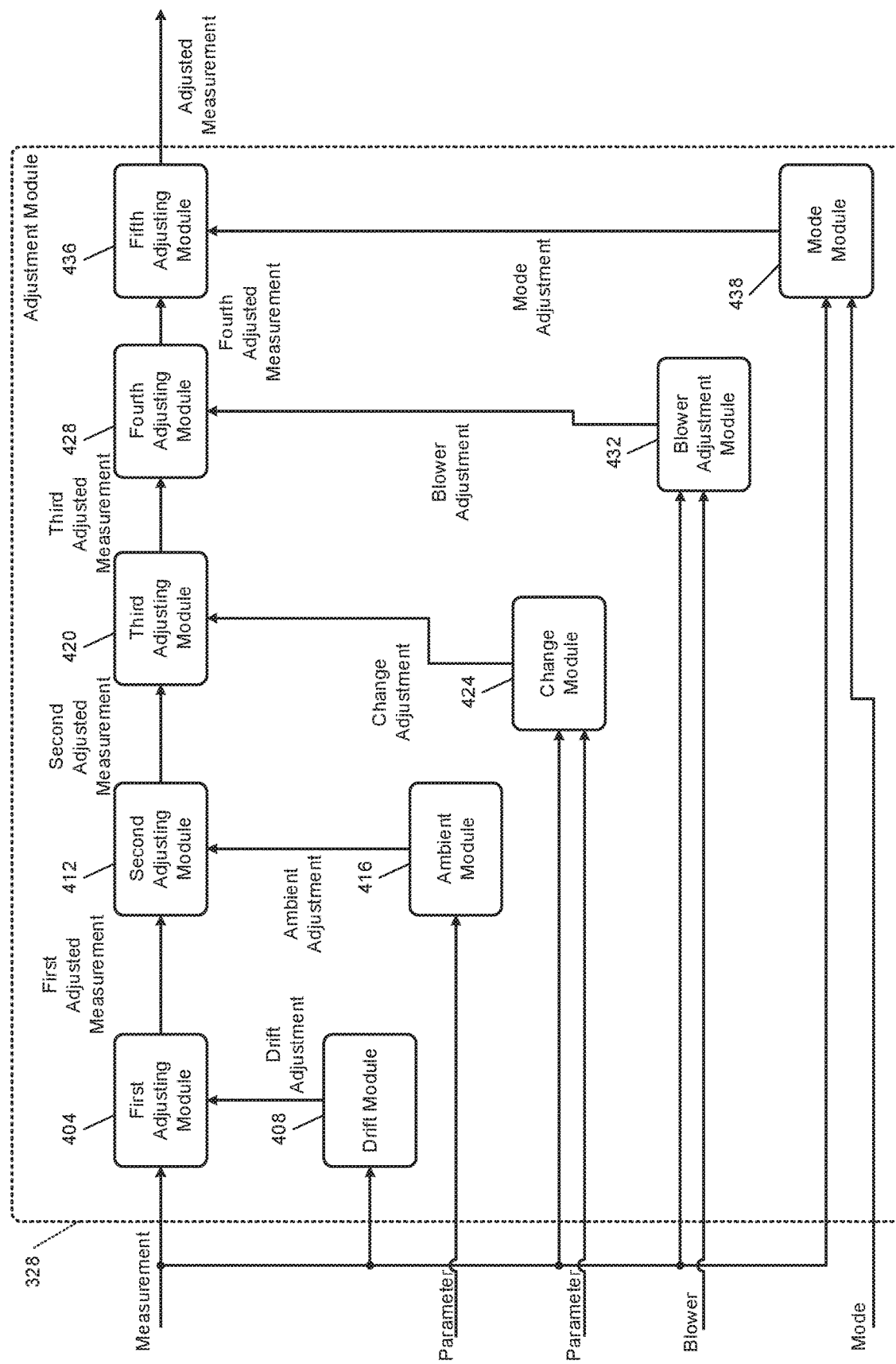
FIG. 4 is a functional block diagram of an example adjustment module.

FIG. 4 is a functional block diagram of an example implementation of the adjustment module 328. A first adjusting module 404 receives the measurement of the refrigerant leak sensor 140. The measurement includes the amount of refrigerant measured by the refrigerant leak sensor 140.

The first adjusting module 404 adjusts the measurement based on a drift adjustment to produce a first adjusted measurement. For example, the first adjusting module 404 may set the first adjusted measurement based on or equal to a sum (addition) of the drift adjustment and the measurement or a product (multiplication) of the drift adjustment and the measurement.

A drift module 408 determines the drift adjustment based on a difference between two of the measurements taken at two different times. For example, the drift module 408 may set the drift adjustment based on or equal to a first measurement from a first time minus a second measurement from a second time. The first measurement may be, for example, stored in the refrigerant leak sensor 140, a first measurement received from refrigerant leak sensor 140 by the first adjusting module 404, a measurement from a previous time (relative to a present time), or another suitable measurement. The second measurement may be a measurement received after the first measurement, the present measurement, or another suitable measurement.

A second adjusting module 412 receives the first adjusted measurement (first adjusted measured amount of refrigerant). The second adjusting module 412 adjusts the first adjusted measurement based on an ambient adjustment to produce a second adjusted measurement. For example, the second adjusting module 412 may set the second adjusted measurement based on or equal to a sum (addition) of the ambient adjustment and the first adjusted measurement or a product (multiplication) of the ambient adjustment and the first adjusted measurement.

An ambient module 416 determines the ambient adjustment based on an ambient parameter, such as an ambient temperature, an ambient pressure, or an ambient relative humidity. The ambient temperature may be measured by the temperature sensor 220 while the blower 204 is off. The ambient pressure may be measured by the pressure sensor 216 while the blower 204 is off. The ambient relative humidity may be measured by relative humidity sensor 224 while the blower 204 is off. The ambient module 416 may determine the ambient adjustment, for example, using one of a lookup table and an equation that relates values of the ambient parameter to ambient adjustments.

In various implementations, the ambient module 416 may determine multiple ambient adjustments, such as a first ambient adjustment based on the ambient temperature, a second ambient adjustment based on the ambient pressure, and a third ambient adjustment based on the ambient relative humidity. In such implementations, the second adjusting module 412 may adjust the first adjustment measurement based on each of the ambient adjustments, such as by adding or multiplying each.

The ambient module 416 may also include inputs signaling blower power state and mode (e.g., heating, cooling, off). This allows the ambient module 416 to anticipate/predict what the changes will be seen in ambient conditions. For instance, if the thermostat is in cooling mode and the blower is on, the ambient module 416 may expect to see a decrease in temperature, and increase in humidity, and an increase in barometric pressure. If these expected changes are reflected in all but one of the sensors, it could signal that that sensor is not operating properly or at the end of its life.

A third adjusting module 420 receives the second adjusted measurement (second adjusted measured amount of refrigerant). The third adjusting module 420 adjusts the second adjusted measurement based on a change adjustment to produce a third adjusted measurement. For example, the third adjusting module 420 may set the third adjusted measurement based on or equal to a sum (addition) of the change adjustment and the second adjusted measurement or a product (multiplication) of the change adjustment and the second adjusted measurement.

A change module 424 determines the change adjustment based on a change in the measurements that occurred in response to a change in a parameter, such as temperature, pressure, or relative humidity. The temperature may be measured by the temperature sensor 220. The pressure may be measured by the pressure sensor 216. The relative humidity may be measured by relative humidity sensor 224. The change module 424 may determine the change adjustment, for example, using one of a lookup table and an equation that relates measurement changes of the parameter to change adjustments.

In various implementations, the change module 424 may determine multiple change adjustments, such as a first change adjustment based on a change in temperature, a second change adjustment based on a change in pressure, and a third change adjustment based on a change in relative humidity. In such implementations, the third adjusting module 420 may adjust the second adjustment measurement based on each of the change adjustments, such as by adding or multiplying each.

In various implementations, the change module 424 may determine the change adjustment(s) based on the final adjusted measurement output by the adjusting module 328. The change module 424 may disable each of the adjustments, however, to determine the change adjustment(s).

A fourth adjusting module 428 receives the third adjusted measurement (third adjusted measured amount of refrigerant). The fourth adjusting module 428 adjusts the third adjusted measurement based on a blower adjustment to produce a fourth adjusted measurement. For example, the fourth adjusting module 428 may set the fourth adjusted measurement based on or equal to a sum (addition) of the blower adjustment and the third adjusted measurement (e.g., in the example of the blower adjustment being a negative value) or a product (multiplication) of the blower adjustment and the third adjusted measurement (e.g., in the example of the blower adjustment being a positive value) or a difference (subtraction) between the third adjusted measurement and the blower adjustment (e.g., in the example of the blower adjustment being a positive value).

A blower adjustment module 432 determines the blower adjustment based on whether the blower 204 is on. When the blower 204 is on for at least a predetermined period, any refrigerant leak should be mitigated, so the measurements from the refrigerant leak sensor 140 should be zero. The measurements may increase or decrease, however, as the refrigerant leak sensor 140 ages. The measurements may become negative in some implementations. The blower adjustment module 432 may therefore set the blower adjustment based on or equal to the measurement (a positive value) from the refrigerant leak sensor 140 when the blower 204 transitions from on to off after being on for at least the predetermined period (such that the measurement should be zero). The blower adjustment module 432 may make the blower adjustment negative (e.g., -measurement) to produce a negative value.

A fifth adjusting module 436 receives the fourth adjusted measurement (fourth adjusted measured amount of refrigerant). The fifth adjusting module 436 adjusts the fourth adjusted measurement based on a mode adjustment to produce a (final) adjusted measurement. For example, the fifth adjusting module 436 may set the adjusted measurement based on or equal to a sum (addition) of the mode adjustment and the fourth adjusted measurement (e.g., in the example of the mode adjustment being a negative value) or a product (multiplication) of the mode adjustment and the fourth adjusted measurement (e.g., in the example of the mode adjustment being a positive value) or a difference (subtraction between the mode adjustment and the fourth adjusted measurement (e.g., in the example of the mode adjustment being a positive value). The leak module 324 determines whether a refrigerant leak is present, as discussed above, based on the adjusted measurement output by the adjustment module 328.

A mode module 438 determines the mode adjustment based on the present mode of operation of the refrigeration system. The thermostat 308 sets the mode of operation to one of heating mode, cooling mode, or off. A pumpout may be performed to pump refrigerant out of the indoor section of the refrigeration system when the refrigeration system is off or transitioned to the heating mode. Therefore, even if a refrigerant leak is present, the measurements of the refrigerant leak sensor 140 should be zero. The mode module 438 may therefore set the mode adjustment based on or equal to a measurement of the refrigerant leak sensor 140 when the mode transitions to the heating mode or otherwise when a pumpout has been performed. The mode module 438 may make the mode adjustment negative (e.g., -measurement) to produce a negative value or a positive value if the measurement has drifted negatively.

While an example order of applying adjustments is provided in FIG. 4, the adjustments may be made in another order. Also, one or more of the adjustments discussed above may be omitted.

Referring back to FIG. 3, an end of life module 440 may indicate whether the refrigerant leak sensor 140 is at or nearing an end of its useful life. The measurements of refrigerant leak sensor 140 may have an accuracy that is less than a predetermined value when the refrigerant leak sensor 140 is at or nearing the end of its useful life. The refrigeration leak sensor 140 should be replaced when the refrigeration leak sensor 140 is at or nearing the end of its useful life.

The end of life module 440 may determine whether the refrigerant leak sensor 140 is at or near the end of its useful life when a change in the measurements in response to a change in relative humidity is greater than or less than a predetermined expected value bounds associated with the change in relative humidity. The change adjustment above may help increase the useful life of the refrigerant leak sensor 140. Additionally or alternatively, the end of life module 440 may determine whether the refrigerant leak sensor 140 is at or near the end of its useful life when a change in the measurements in response to a change in temperature is greater than or less than a predetermined expected value bounds associated with the change in temperature. The end of life module 440 may determine whether the refrigerant leak sensor 140 is at or near the end of its useful life when a change in the measurements in response to a change in pressure is less than a predetermined expected value associated with the change in pressure. The end of life module 440 may additionally determine that the refrigerant leak sensor 140 is at or near the end of its useful life when the mode adjustment (determined based on the difference between the first and second measurements) is greater than or less than a predetermined value.

The end of life module 440 may additionally or alternatively determine that the refrigerant leak sensor 140 is at or near the end of its useful life when one or more of the adjustments (e.g., the blower adjustment, the drift adjustment, the mode adjustment, etc.) is greater than or less than a predetermined value.

The end of life module 440 may take one or more remedial actions when the refrigerant leak sensor 140 is at or near the end of its useful life. For example, the end of life module 440 may illuminate a light, store a predetermined code in memory, transmit a message to one or more computing devices via a network, or perform one or more other remedial actions when the refrigerant leak sensor 140 is at or near the end of its useful life.

Figure 5:
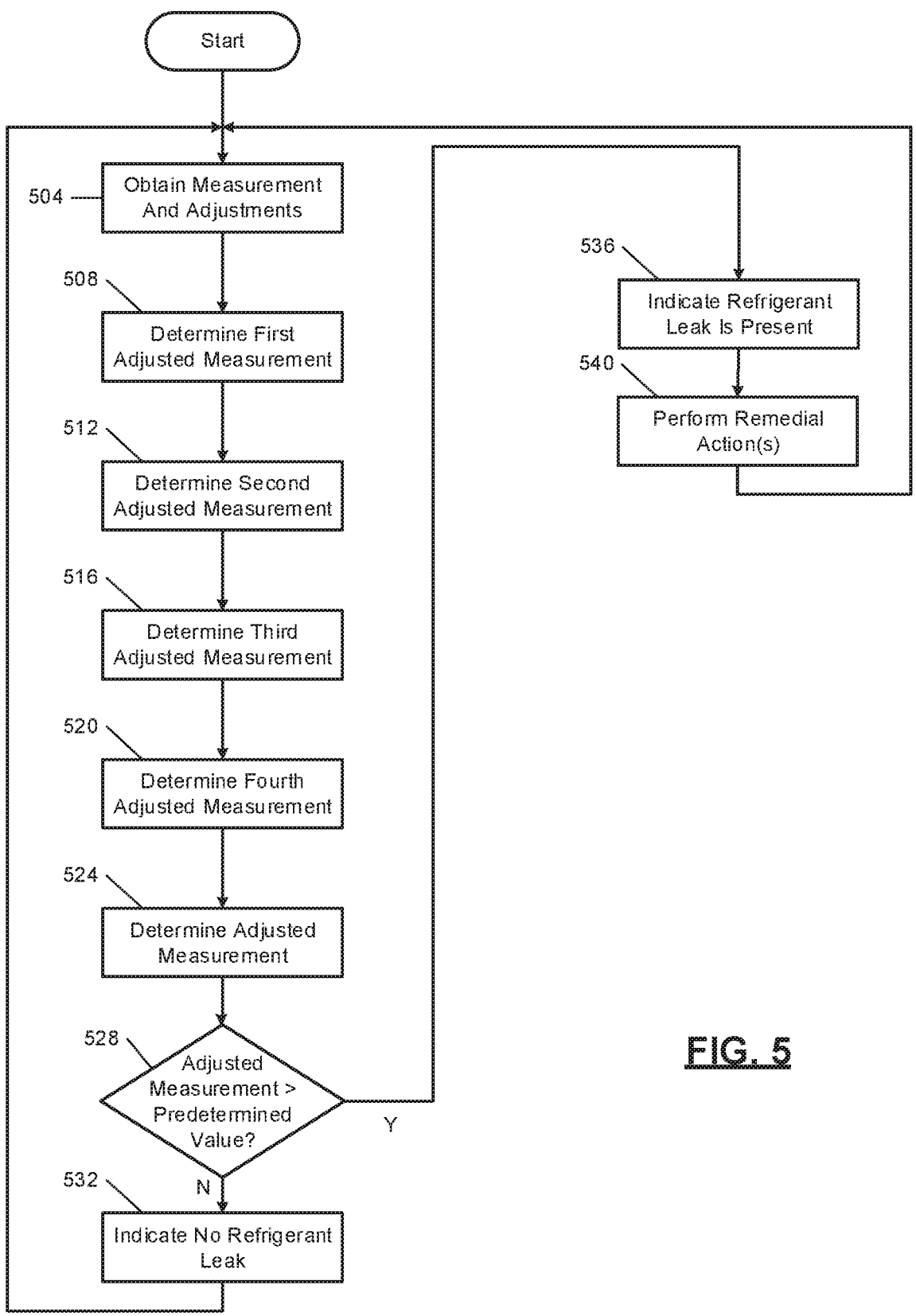
FIG. 5 is a flowchart depicting an example method of adjusting measurements of a refrigerant leak sensor and performing leak detection and remediation.

FIG. 5 is a flowchart depicting an example method of adjusting the measurements of the refrigerant leak sensor 140 and performing leak detection and remediation. Control begins with 504, where the adjustment module 328 receives a measurement from the refrigerant leak sensor 140. The adjustment module 328 also obtains or determines the adjustments, as described above.

At 508, the first adjusting module 404 may determine the first adjusted measurement based on the measurement (from 504) and the drift adjustment. At 512 the second adjusting module 412 determines the second adjusted measurement based on the first adjusted measurement and the ambient adjustment(s). At 516, the third adjusting module 420 determines the third adjusted measurement based on the second adjusted measurement and the change adjustment(s). At 520, the fourth adjusting module determines the fourth adjusted measurement based on the third adjusted measurement and the blower adjustment. At 524, the fifth adjusting module 436 determines the adjusted measurement based on the fourth adjusted measurement and the mode adjustment. As described above, one or more of the adjustments may be omitted, and a different order of adjustment may be used.

At 528, the leak module 324 determines whether the adjusted measurement is greater than the predetermined amount of refrigerant. If 528 is false, the leak module 324 indicates that no refrigerant leak is present at 532, and control returns to 504 for a next measurement. If 528 is true, control continues with 536.

At 536, the leak module 324 indicates that a refrigerant leak is present. At 540, in response to the diagnosis of the presence of a refrigerant leak, one or more remedial actions are performed. For example, the blower control module 320 may turn the blower 204 on for a predetermined period to dissipate any leaked refrigerant. The compressor control module 304 may also turn the compressor 102 off for the predetermined period. Before turning the compressor off, the compressor control module 304 may leave the compressor 102 on to pump refrigerant out from within the building. One or more valves may be actuated to trap the refrigerant outside of the building.

Figure 6:
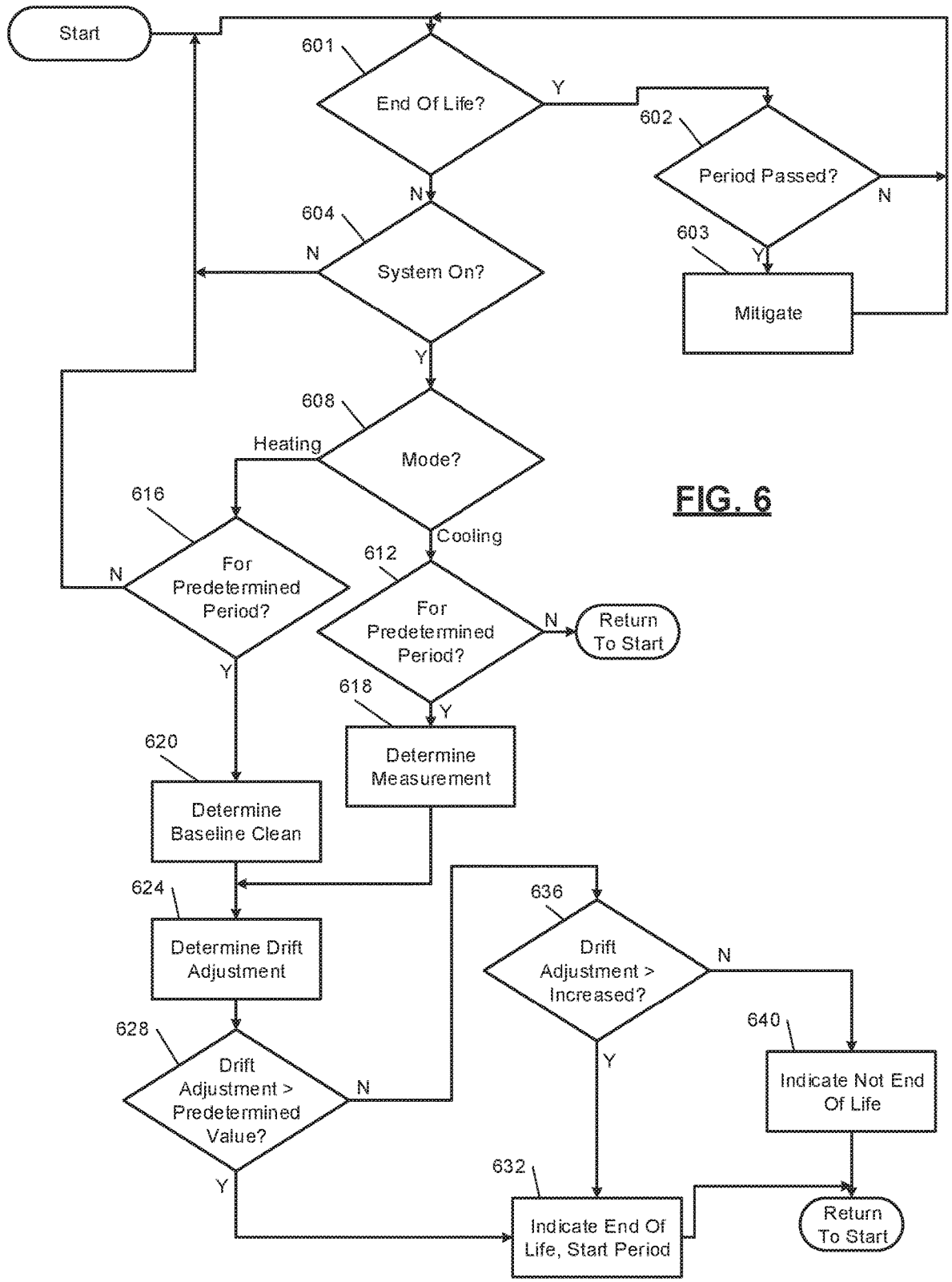
FIG. 6 is a flowchart depicting an example method of determining a drift adjustment and diagnosing an end of life condition.

FIG. 6 is a flowchart depicting an example method of determining the drift adjustment and determining whether the refrigerant leak sensor 140 is at or near the end of its useful life. Control begins with 601 where the adjustment module 328 determines whether an indication that the refrigerant leak sensor 140 is at or near the end of its useful life has been generated. If 601 is true, control transfers to 602. IF 601 is false, control continues with 604. At 602, the adjustment module 328 determines whether a predetermined period has passed since the indication was generated. If 602 is false, mitigation of a leak is performed at 603. For example, the blower control module 320 may turn on the blower 204. Additionally, the control module 130 may lockout one or more lockout devices to prevent ignition within the building. If 602 is false, control may return to 601. The predetermined period may be, for example, 24 hours (1 day) or another suitable period.

At 604, the adjustment module 328 determines whether the refrigeration system is on such that heating or cooling of the building is being performed. If 604 is true, control continues with 608. If 604 is false, the adjustment module 328 may leave the drift adjustment unchanged and return to 601.

At 608, the adjustment module 328 determines the present mode of operation of the refrigeration system. If the refrigeration system is operating in the heating mode, control continues with 616. If the refrigeration system is operating in the cooling mode, control continues with 612.

At 612, the adjustment module 328 determines whether the refrigeration system has been operating in the cooling mode for at least a predetermined period, such as approximately 5 minutes or another suitable period that is greater than zero. If 612 is true, control continues with 618. If 612 is false, control returns to 601 and the adjustment module 328 leaves the drift adjustment unchanged. At 616, the adjustment module 328 determines whether the refrigeration system has been operating in the heating mode for at least a predetermined period, such as approximately 5 minutes or another suitable period that is greater than zero. If 616 is true, control continues with 620. If 616 is false, control returns to 601 and the adjustment module 328 leaves the drift adjustment unchanged.

At 618, the drift module 408 determines a baseline measurement, such as the present measurement of the refrigerant leak sensor 140 or an average (e.g., a standard average, a moving average, or a weighted moving average) of the last X measurements of the refrigerant leak sensor 140. X may be, for example, the last 10 measurements or another suitable number of measurements or all of the measurements from the refrigerant leak sensor 140 obtained over the last X units of time (e.g., seconds, minutes, etc.). Last may refer to the temporal sense relative to a present time.

At 620, the drift module 408 determines a baseline clean measurement, such as the present measurement of the refrigerant leak sensor 140 or an average (e.g., a standard average, a moving average, or a weighted moving average) of the last X measurements of the refrigerant leak sensor 140. X may be, for example, the last 10 measurements or another suitable number of measurements or all of the measurements from the refrigerant leak sensor 140 obtained over the last X units of time (e.g., seconds, minutes, etc.). Last may refer to the temporal sense relative to a present time. Control continues with 624 after 618 and 620.

At 624, the drift module 408 determines the drift adjustment based on the baseline clean measurement (from 620) and the baseline measurement (from 618). The initial measurement may be stored in memory. The drift module 408 may set the drift adjustment based on or equal to a difference between the baseline measurement and the baseline clean measurement, such as the baseline measurement minus the baseline clean measurement.

At 628, the end of life module 440 may determine whether the drift adjustment (e.g., a magnitude) is greater than a predetermined value. If 628 is true, the end of life module 440 may indicate that the refrigerant leak sensor is at or near the end of its useful life and take one or more remedial actions at 632. The end of life module 440 may also reset the period (compared at 602) at 632. If 628 is false, control may transfer to 636. At 636, the end of life module 440 may determine whether the drift adjustment (e.g., the magnitude) has increased by more than a predetermined amount relative to an initial drift adjustment or increased during each of the last Y number of updates (at 624). Y is an integer greater than or equal to 2. If 636 is true, the end of life module 440 may indicate that the refrigerant leak sensor 140 is at or near the end of its useful life and take one or more remedial actions at 632. If 636 is false, the end of life module 440 may indicate that the refrigerant leak sensor 140 is not at or near the end of its useful life at 640, and control may return to 601.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A refrigerant measurement adjustment system, comprising:
a refrigerant sensor for a building and configured to measure an amount of refrigerant present in air outside of a refrigeration system of the building; and
an adjustment module configured to:
adjust the measured amount of refrigerant based on an adjustment to produce an adjusted measurement; and
determine the adjustment based on at least one of:
an air temperature;
an air pressure;
a relative humidity of air;
a mode of operation of the refrigeration system;
a change in the measured amounts of the refrigerant sensor over time; and
whether a blower that blows air across a heat exchanger of the refrigeration system located within the building is on, and
set the adjustment based on the measured amount of refrigerant in response to a determination that at least one of:
the mode of operation is in a heating mode for a first predetermined period;
a pumpout of refrigerant from within the building has been performed;
the mode of operation transitions from a cooling mode to the heating mode and a pumpout of refrigerant from within the building has been performed; and
the blower has been on for at least a second predetermined period.

2. The refrigerant measurement adjustment system of claim 1 further comprising a leak module configured to indicate whether a refrigerant leak is present based on the adjusted measurement.

3. The refrigerant measurement adjustment system of claim 1 wherein the adjustment module is configured to determine the adjustment based on the air temperature.

4. The refrigerant measurement adjustment system of claim 3 wherein the adjustment module is configured to determine the adjustment based on a change in the air temperature.

5. The refrigerant measurement adjustment system of claim 1 wherein the adjustment module is configured to determine the adjustment based on the air pressure.

6. The refrigerant measurement adjustment system of claim 5 wherein the adjustment module is configured to determine the adjustment based on a change in the air pressure.

7. The refrigerant measurement adjustment system of claim 1 wherein the adjustment module is configured to determine the adjustment based on the relative humidity.

8. The refrigerant measurement adjustment system of claim 7 wherein the adjustment module is configured to determine the adjustment based on a change in the relative humidity.

9. The refrigerant measurement adjustment system of claim 1 wherein the adjustment module is configured to:
adjust the measured amount of refrigerant further based on a second adjustment to produce the adjusted measurement; and
determine the second adjustment based on the change in the amount of refrigerant measured by the refrigerant sensor over time.

10. The refrigerant measurement adjustment system of claim 1 wherein the adjustment module is configured to set the adjusted measurement based on one of (a) the measured amount of refrigerant plus the adjustment and (b) the measured amount of refrigerant minus the adjustment.

11. The refrigerant measurement adjustment system of claim 1 wherein the adjustment module is configured to set the adjusted measurement based on the measured amount of refrigerant multiplied by the adjustment.

12. The refrigerant measurement adjustment system of claim 1 wherein the adjustment module is configured to adjust the measured amount based on at least two adjustments determined based on at least two of:
the air temperature;
the air pressure;
the relative humidity of air;
the mode of operation of the refrigeration system;
the change in the measured amounts of the refrigerant sensor over time; and
whether the blower that blows air across the heat exchanger of the refrigeration system located within the building is on.

13. The refrigerant measurement adjustment system of claim 1 wherein the adjustment module is configured to adjust the measured amount based on adjustments determined based on each of:
the air temperature;
the air pressure;
the relative humidity of air;
the mode of operation of the refrigeration system;
the change in the measured amounts of the refrigerant sensor over time; and
whether the blower that blows air across the heat exchanger of the refrigeration system located within the building is on.

14. The refrigerant measurement adjustment system of claim 1 wherein:
the adjustment module is configured to adjust the measured amount of refrigerant based on the change in the measured amounts of the refrigerant sensor over time; and
the refrigerant measurement adjustment system further includes an end of life module configured to indicate that the refrigerant sensor is at an end of its useful life when a magnitude of the change is greater than a predetermined value.

15. The refrigerant measurement adjustment system of claim 1 wherein:
the adjustment module is configured to adjust the measured amount of refrigerant based on the change in the measured amounts of the refrigerant sensor over time; and
the refrigerant measurement adjustment system further includes an end of life module configured to indicate that the refrigerant sensor is at an end of its useful life when a magnitude of the change increases on at least a predetermined number of consecutive instances.

16. A refrigerant measurement adjustment method, comprising:
by a refrigerant sensor for a building, measuring an amount of refrigerant present in air outside of a refrigeration system of the building;
adjusting the measured amount of refrigerant based on an adjustment to produce an adjusted measurement;
determining the adjustment based on at least one of:
an air temperature;
an air pressure;
a relative humidity of air;
a mode of operation of the refrigeration system;

a change in the measured amounts of the refrigerant sensor over time; and whether a blower that blows air across a heat exchanger of the refrigeration system located within the building is on; and setting the adjustment based on the measured amount of refrigerant in response to a determination that at least one of:

the mode of operation is in a heating mode for a first predetermined period;

a pumpout of refrigerant from within the building has been performed;

the mode of operation transitions from a cooling mode to the heating mode and a pumpout of refrigerant from within the building has been performed; and the blower has been on for at least a second predetermined period.

17. A refrigerant measurement adjustment system, comprising:

a refrigerant sensor for a building and configured to measure an amount of refrigerant present in air outside of a refrigeration system of the building; and an adjustment module configured to:

adjust the measured amount of refrigerant based on an adjustment to produce an adjusted measurement; and determine the adjustment based on at least one of:
an air temperature; and
a relative humidity of air; and set the adjustment based or the measured amount of refrigerant in response to a determination that at least one of:

a mode of operation is in a heating mode for a first predetermined period;

a pumpout of refrigerant from within the building has been performed;

the mode of operation transitions from a cooling mode to the heating mode and a pumpout of refrigerant from within the building has been performed; and a blower has been on for at least a second predetermined period.

* * * * *